(12) United States Patent
Sima et al.

(10) Patent No.: US 10,916,242 B1
(45) Date of Patent: Feb. 9, 2021

(54) INTENT RECOGNITION METHOD BASED ON DEEP LEARNING NETWORK

(71) Applicant: NANJING SILICON INTELLIGENCE TECHNOLOGY CO., LTD., Jiangsu (CN)

(72) Inventors: Huapeng Sima, Nanjing (CN); Ao Yao, Nanjing (CN)

(73) Assignee: NANJING SILICON INTELLIGENCE TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 16/957,088

(22) PCT Filed: Mar. 26, 2020

(86) PCT No.: PCT/CN2020/081302
§ 371 (c)(1),
(2) Date: Jun. 22, 2020

(30) Foreign Application Priority Data

Aug. 7, 2019 (CN) .......................... 2019 1 0724662

(51) Int. Cl.
*G10L 15/18* (2013.01)
*G10L 15/22* (2006.01)
(Continued)

(52) U.S. Cl.
CPC .......... *G10L 15/1815* (2013.01); *G06N 20/00* (2019.01); *G10L 15/063* (2013.01); *G10L 15/183* (2013.01); *G10L 15/22* (2013.01)

(58) Field of Classification Search
CPC ....... G10L 15/00; G10L 15/183; G10L 15/22; G10L 15/063; G10L 15/1815; G06N 20/00
See application file for complete search history.

(56) References Cited

U.S. PATENT DOCUMENTS

| 6,513,005 B1 * | 1/2003 | Qin | G06K 9/6293 704/231 |
| 10,347,241 B1 | 7/2019 | Meng et al. | |

(Continued)

FOREIGN PATENT DOCUMENTS

| CN | 109241255 A | 1/2019 |
| CN | 109657229 A | 4/2019 |

(Continued)

OTHER PUBLICATIONS

International Search Report in corresponding International Application No. PCT/CN2020/081302 dated Jun. 30, 2020, with English translation.

(Continued)

*Primary Examiner* — Michael Colucci
(74) *Attorney, Agent, or Firm* — Harness, Dickey & Pierce, P.L.C.

(57) ABSTRACT

The present invention relates to the field of intelligent recognition, and discloses an intent recognition method based on a deep learning network, resolving a technical problem that accuracy of intent recognition is not high. A key point of the technical solutions is migrating features of a first deep learning network to a second deep learning network, mainly including: converting data sets of all fields into a word sequence WS and a corresponding PINYIN sequence PS; meanwhile, manually labeling the data set of a certain field and converting the data set into a word sequence WD, a PINYIN sequence PD, and a label; inputting the word sequence WS and the PINYIN sequence PS to the first deep learning network for training to obtain a language model, initializing and updating an encoding layer parameter matrix of the language model; and weighting and inputting the word sequence WD and the PINYIN sequence PD to the second deep learning network after the word sequence WD and the PINYIN sequence PD are inputted to (Continued)

the second deep learning network to be encoded, to train an intent recognition model. Accuracy of performing intent recognition by using the intent recognition model is higher.

9 Claims, 2 Drawing Sheets

(51) Int. Cl.
*G06N 20/00* (2019.01)
*G10L 15/183* (2013.01)
*G10L 15/06* (2013.01)

(56) References Cited

U.S. PATENT DOCUMENTS

| | | | | |
|---|---|---|---|---|
| 2006/0048055 | A1* | 3/2006 | Wu | G06F 40/232 |
| | | | | 715/262 |
| 2011/0055585 | A1* | 3/2011 | Lee | H04L 9/0844 |
| | | | | 713/183 |
| 2019/0102678 | A1* | 4/2019 | Chang | G06K 9/627 |
| 2019/0122108 | A1* | 4/2019 | Kliegl | G06F 17/16 |
| 2020/0210824 | A1* | 7/2020 | Poornaki | G06N 3/0445 |
| 2020/0334326 | A1* | 10/2020 | Zhang | G06N 20/00 |
| 2020/0342953 | A1* | 10/2020 | Morrone | G06N 3/08 |

FOREIGN PATENT DOCUMENTS

| | | |
|---|---|---|
| CN | 109857868 A | 6/2019 |
| CN | 110232439 A | 9/2019 |

OTHER PUBLICATIONS

Written Opinion in corresponding International Application No. PCT/CN2020/081302 dated Jun. 30, 2020, with English translation.

Li Wei-lin, et al., "Speech Recognition System Based on Deep Neural Network". Computer Science, vol. 43, No. 11A, School of Technology, Beijing Forestry University, Beijing 100083, China, Nov. 2016.

First Office Action issued in CN 201910724662.6, dated Sep. 19, 2019.

* cited by examiner

INTENT RECOGNITION METHOD BASED ON DEEP LEARNING NETWORK

CROSS-REFERENCE TO RELATED APPLICATIONS

This application is a U.S. National Phase Application under 35 U.S.C. 371 of International Application No. PCT/CN2020/081302 filed on Mar. 26, 2020, which claims priority to Chinese Application No. 201910724662.6, filed with the Chinese Patent Office on Aug. 7, 2019 and entitled "INTENT RECOGNITION METHOD BASED ON DEEP LEARNING NETWORK". The entire disclosures of the above applications are incorporated herein by references in theft entirety.

FIELD OF THE INVENTION

The present disclosure relates to the field of intelligent recognition, and in particular, to an intent recognition method based on a deep learning network.

BACKGROUND OF THE INVENTION

In the field of man-machine dialogue, intent recognition is one of the most important core technologies, and understanding to natural semantics is one of premises for achieving a man-machine dialogue. At present, basic intent recognition methods include rule-based methods based on dictionaries and templates, determining an intent of a user on the basis of querying a clicked log and based on a classification model, and the like. It is agreed in the industry that the most difficult thing of intent recognition is obtaining a labeled data. Therefore, researches on methods based on a word sequence and a PINYIN sequence that have massive data volumes are rarely performed, and recognition models trained by using feature vectors of words and PINYIN are almost never to be mentioned.

SUMMARY OF THE INVENTION

An objective of the present disclosure is to provide an intent recognition method based on a deep learning network, to perform intent recognition by training a recognition model by using feature vectors of words and PINYIN.

The foregoing technical objective of the present disclosure is achieved through the following technical solutions.

An intent recognition method based on deep learning network is provided, which includes:

obtaining historical voice data of various fields and converting the same into text information S1, and meanwhile, obtaining text information S2 from an open data source, where the S1 and the S2 are combined to obtain a data set S;

obtaining historical voice data of a field and converting the same into text, to obtain a data set D;

manually labeling D, performing intent category classification to obtain D', and converting D' into a word sequence WD, a PINYIN sequence PD, and a label;

converting the data set S into a word sequence WS and a PINYIN sequence PS, and inputting the word sequence WS and the PINYIN sequence PS to a first deep learning network to train a language model LM;

obtaining a word encoding layer parameter matrix W and a PINYIN encoding layer parameter matrix U of the language model LM, inputting the word encoding layer parameter matrix W and the PINYIN encoding layer parameter matrix U into a second deep learning network to initialize an encoding layer to obtain parameter matrixes W1, W2, U1 and U2, wherein the second deep learning network includes an encoding layer and a convolution layer;

training the second deep learning network by using D', wherein W1 and U1 are updated as parameter matrixes W1' and U1' with each training of D', while W2 and U2 are kept unchanged;

inputting the word sequence WD, the PINYIN sequence PD, and the label to the second deep learning network, encoding the word sequence WD and the PINYIN sequence PD by using the parameter matrixes W1', U1', W2 and U2 of the encoding layer, and weighting and inputting the encoded word sequence WD and PINYIN sequence PD to the convolution layer of the second deep learning network for training to obtain an intent recognition model; and performing intent recognition by using the intent recognition model.

Further, the word sequence WD and the PINYIN sequence PD are encoded by using the parameter matrixes W1', U1' and W2 of the encoding layer, and the encoded word sequence WD and PINYIN sequence PD are weighted and inputted to the convolution layer of the second deep learning network for training to obtain the intent recognition model.

Further, the word sequence WD and the PINYIN sequence PD are encoded by using the parameter matrixes W1', U1' and U2 of the encoding layer, and the encoded word sequence WD and PINYIN sequence PD are weighted and inputted to the convolution layer of the second deep learning network for training to obtain the intent recognition model.

Further, the word sequence WD and the PINYIN sequence PD are encoded by using the parameter matrixes W1', W2 and U2 of the encoding layer, and the encoded word sequence WD and PINYIN sequence PD are weighted and inputted to the convolution layer of the second deep learning network for training to obtain the intent recognition model.

Further, the word sequence WD and the PINYIN sequence PD are encoded by using the parameter matrixes U1', W2 and U2 of the encoding layer, and the encoded word sequence WD and PINYIN sequence PD are weighted and inputted to the convolution layer of the second deep learning network for training to obtain the intent recognition model.

Further, the first deep learning network is a language model, and is trained by using a gradient descent algorithm.

Further, the language model may include a word2vec network structure, an LSTM network structure, a bert network structure, a gpt network structure, and an elmo network structure.

Further, the second deep learning network is an intent recognition model, and is trained by using a cross entropy loss function and a gradient descent algorithm.

Further, the second deep learning network may include an input layer, the encoding layer, the convolution layer, a pooling layer, a fully-connected layer, and an output layer.

In view of the above, a task of the first deep learning network is to train the language model, and a task of the second deep learning network is to train the intent recognition model. If the first deep learning network corresponds to a task A, and the second deep learning network corresponds to a task B, in the present disclosure, an intent recognition model with higher recognition accuracy is obtained by training through a technical means of migrating learning features of the task A to the task B. Beneficial effects of the present disclosure are: converting the data sets of various fields into the word sequence WS and the corresponding PINYIN sequence PS, and meanwhile manually labeling the data set of a certain field, to obtain the word sequence WD and the PINYIN sequence PD, where the labeled data set includes a label; inputting the word sequence WS and the PINYIN sequence PS to the first deep learning network for training to obtain the language model; initializing and updating an encoding layer parameter matrix of the language model; subsequently, inputting the word sequence WD and the PINYIN sequence PD to the second deep learning network for encoding; and weighting and inputting the encoded word sequence WD and PINYIN sequence PD to the second deep learning network to train an intent recognition model. Accuracy of performing intent recognition by using the intent recognition model is high.

DETAILED DESCRIPTION OF THE EMBODIMENTS

The present disclosure is further described in detail below with reference to the accompanying drawings.

It should be understood that the terms "first" and "second" are used only for the purpose of description, should not be construed as indicating or implying the relative importance or implicitly specifying the number of the indicated technical features, but are merely used for distinguishing different components.

Figure 1:
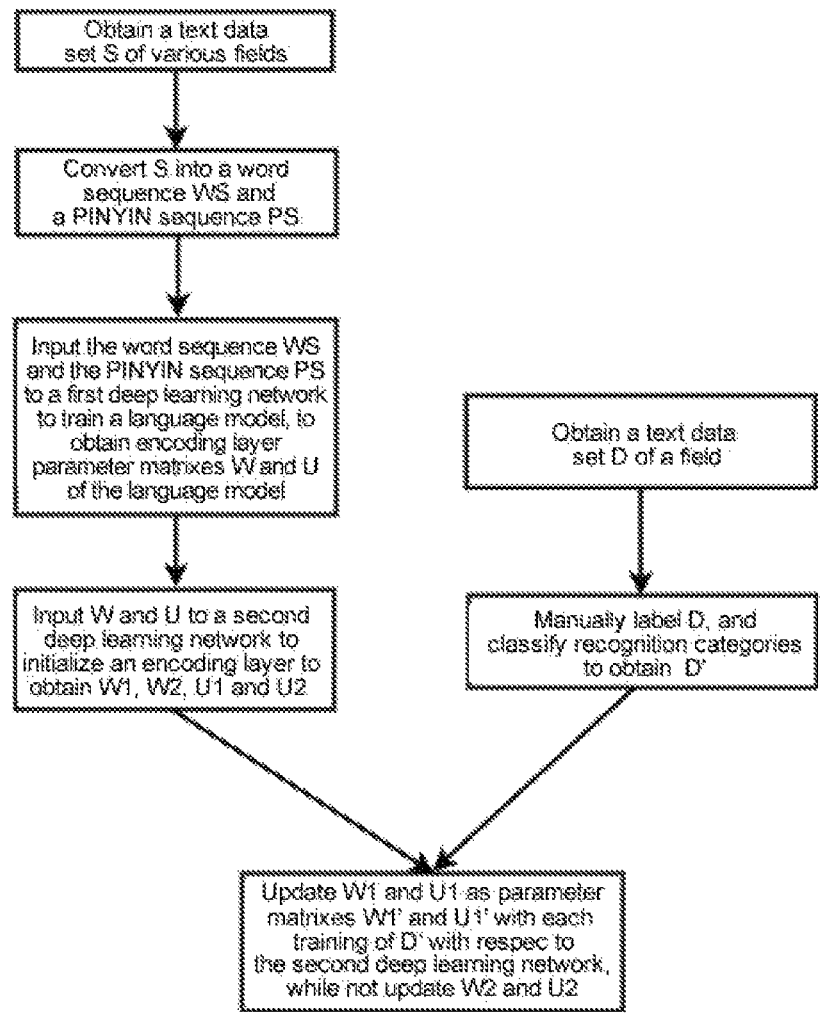
FIG. 1 is a schematic diagram of an updating process of a parameter matrix according to the present disclosure.

FIG. 1 is a schematic diagram of an updating process of a parameter matrix according to the present disclosure. First, historical voice data of various fields is obtained, and is converted into text information S1 by using a known ASR (Automatic Speech Recognition) method (for example, API of IFLYTEK or Ali Speech Recognition). Meanwhile, text information S2 is obtained from a open data source (such as Sougou news or MicroBlog corpus). S1 and S2 are combined to obtain a data set S.

The data set S is converted into a word sequence WS and a PINYIN sequence PS, which are inputted to a first deep learning network to train a language model. A network structure of the language model may be word2vec, LSTM, bert, gpt, elmo (a bilateral LSTM network), or the like. Subsequently, a word encoding layer parameter matrix W and a PINYIN encoding layer parameter matrix U of the language model are obtained. The word encoding layer parameter matrix W and the PINYIN encoding layer parameter matrix U are inputted to a second deep learning network to initialize an encoding layer to obtain parameter matrixes W1, W2, U1 and U2. The second deep learning network herein includes an input layer, the encoding layer, a convolution layer, a pooling layer, a fully-connected layer, and an output layer.

Historical voice data of a field is obtained and converted into text, to obtain a data set D. D is manually labeled, and intent category classification is performed to obtain D'. Manual labeling herein refers to labeling of the intent categories, rather than a simple syncopation to words or the like. In other words, intent of specific content of a sentence is indicated. For example, the intent category of sentences "how about the weather today" and "it is so cold today" is labeled as "weather".

Figure 2:
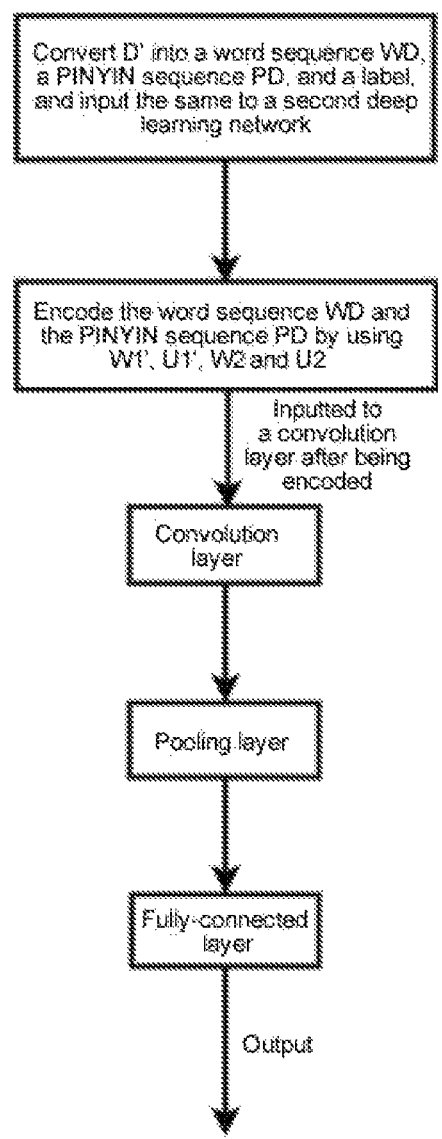
FIG. 2 is a schematic diagram of a training process of an intent model according to the present disclosure.

When the second deep learning network is trained by using D', W1 and U1 are updated as parameter matrixes W1' and U1' with each training of D', while W2 and U2 are kept unchanged without updating thereof. FIG. 2 is a schematic diagram of a training process of an intent model according to the present disclosure. Training data in D' is converted into a word sequence WD, a PINYIN sequence PD, and a label and is inputted to the second deep learning network. The word sequence WD and the PINYIN sequence PD are encoded by using the parameter matrixes W1', U1', W2 and U2 of the encoding layer of the second deep learning network, and the encoded word sequence WD and PINYIN sequence PD are weighted and inputted to the convolution layer of the second deep learning network for training to obtain an intent recognition model. Finally, intent recognition is performed by using the intent recognition model.

A function of the label herein is obtaining a gradient value updated by each beach by using a cross entropy loss function and a gradient descent algorithm. The cross entropy loss function is:

$$J(\theta) = -\frac{1}{m}\sum_{i=1}^{m} y_i \log(h_\theta(x^{(i)})) + (1-y_i)\log(1-h_\theta(x^{(i)})),$$

where m represents a positive integer, $y_i$ represents a label before being inputted to the second deep learning network, $y_{i\_}$ represents a label after being outputted from the second deep learning network, $x^{(i)}$ represents the encoded word sequence WD and PINYIN sequence PD that are inputted, $h_\theta(x^{(i)})$ represents the constructed second deep learning network, and $y_{i\_}=h_\theta(x^{(i)})$. The second deep learning network is updated by using the gradient descent algorithm.

The parameter matrixes of the encoding layer may encode the word sequence WD and the PINYIN sequence PD in different combinations. These combinations include (W1', U1' W2), (1I', U1', U2), (W1', W2, U2), and (W1', W2, U2). The encoded word sequence WD and PINYIN sequence PD that are encoded by using these combinations of the parameter matrixes are weighted and inputted to the convolution layer of the second deep learning network for training to obtain the intent recognition model.

In view of the above, the first deep learning network has sufficient training texts. Therefore, the second deep learning network may be trained by using training data of the first deep learning network, so as to improve training effects of the second deep learning network. In this way, an intent recognition model with a higher intent recognition accuracy may be obtained by training.

In addition, the first deep learning network is a language model, and is trained by using the gradient descent algorithm. The second deep learning network is an intent recognition model, and is trained by using the cross entropy loss function and the gradient descent algorithm.

Main parameters of the second deep learning network are shown in table 1.

TABLE 1

| Parameter | Parameter value |
|---|---|
| char_dim | 100 |
| PINYIN_dim | 100 |

TABLE 1-continued

| Parameter | Parameter value |
|---|---|
| Convolution kernel | 3, 4, 5 |
| dropout | 0.7 |
| Gradient descent | 0.1 |

According to the present disclosure, in the field of credit cards, accuracy of an intent recognition model based on a deep learning network that is trained by using a labeled data set that includes 137737 pieces of training set data, 11392 pieces of test set data, and 55 recognition categories is 79.97%. In the field of loans, accuracy of an intent recognition model based on a deep learning network that is trained by using a labeled data set that includes 310556 pieces of training set data, 22967 pieces of test set data, and 51 recognition categories is 92.10%, as shown in table 2.

TABLE 2

| Field | Number of training sets | Number of test sets | Number of recognition categories | Accuracy of an intent recognition model based on a deep learning network |
|---|---|---|---|---|
| Credit card | 137737 | 11392 | 55 | 79.97% |
| Loan | 310556 | 22967 | 51 | 92.10% |

In addition, the data provided in table 2 does not include recognition accuracy of an intent recognition model trained when the PINYIN sequence is constantly updated and encoded, because a data volume of a PINYIN sequence is so massive where a lot of data is required on the one hand, and an operation workload is also massive on the other hand. Therefore, the protection scope of the present disclosure is limited by the claims and equivalents thereof. Any improvements without creative efforts that are made under the spirit of the present disclosure all fall within the protection scope of the present disclosure.

What is claimed is:

1. An intent recognition method based on deep learning network, comprising:
   obtaining historical voice data of various fields and converting the same into text information S1, and meanwhile, obtaining text information S2 from an open data source, wherein the S1 and the S2 are combined to obtain a data set S;
   obtaining historical voice data of a field and converting the same into text, to obtain a data set D;
   manually labeling D, performing intent category classification to obtain D', and converting D' into a word sequence WD, a PINYIN sequence PD, and a label;
   converting the data set S into a word sequence WS and a PINYIN sequence PS, and inputting the same to a first deep learning network to train a language model;
   obtaining a word encoding layer parameter matrix W and a PINYIN encoding layer parameter matrix U of the language model, inputting the word encoding layer parameter matrix W and the PINYIN encoding layer parameter matrix U to a second deep learning network to initialize an encoding layer to obtain parameter matrixes W1, W2, U1 and U2, wherein
   the second deep learning network comprises an encoding layer and a convolution layer;
   training the second deep learning network by using D', where W1 and U1 are updated as parameter matrixes W1' and U1' with each training of D' while W2 and U2 are kept unchanged;
   inputting the word sequence WD, the PINYIN sequence PD, and the label to the second deep learning network, encoding the word sequence WD and the PINYIN sequence PD by using the parameter matrixes W1', U1', W2 and U2 of the encoding layer, and weighting and inputting the encoded word sequence WD and PINYIN sequence PD to the convolution layer of the second deep learning network for training to obtain an intent recognition model; and
   performing intent recognition by using the intent recognition model.

2. The intent recognition method based on deep learning network according to claim 1, wherein the word sequence WD and the PINYIN sequence PD are encoded by using the parameter matrixes W1', U1' and W2 of the encoding layer, and the encoded word sequence WD and PINYIN sequence PD are weighted and inputted to the convolution layer of the second deep learning network for training to obtain the intent recognition model.

3. The intent recognition method based on deep learning network according to claim 1, wherein the word sequence WD and the PINYIN sequence PD are encoded by using the parameter matrixes W1', U1' and U2 of the encoding layer, and the encoded word sequence WD and PINYIN sequence PD are weighted and inputted to the convolution layer of the second deep learning network for training to obtain the intent recognition model.

4. The intent recognition method based on deep learning network according to claim 1, wherein the word sequence WD and the PINYIN sequence PD are encoded by using the parameter matrixes W1', W2 and U2 of the encoding layer, and the encoded word sequence WD and PINYIN sequence PD are weighted and inputted to the convolution layer of the second deep learning network for training to obtain the intent recognition model.

5. The intent recognition method based on deep learning network according to claim 2, wherein the word sequence WD and the PINYIN sequence PD are encoded by using the parameter matrixes U1', W2 and U2 of the encoding layer, and the encoded word sequence WD and PINYIN sequence PD are weighted and inputted to the convolution layer of the second deep learning network for training to obtain the intent recognition model.

6. The intent recognition method based on deep learning network according to claim 1, wherein the first deep learning network is a language model, and is trained by using a gradient descent algorithm.

7. The intent recognition method based on deep learning network according to claim 6, wherein the language model comprises a word2vec network structure, an LSTM network structure, a bert network structure, a gpt network structure, and an elmo network structure.

8. The intent recognition method based on deep learning network according to claim 1, wherein the second deep learning network is an intent recognition model, and is trained by using a cross entropy loss function and a gradient descent algorithm.

9. The intent recognition method based on deep learning network according to claim 8, wherein the second deep learning network comprises an input layer, the encoding layer, the convolution layer, a pooling layer, a fully-connected layer, and an output layer.

\* \* \* \* \*